United States Patent
Alelyunas et al.

(10) Patent No.: US 6,256,353 B1
(45) Date of Patent: *Jul. 3, 2001

(54) METHOD AND APPARATUS FOR GENERATING A PROBING SIGNAL FOR A SYSTEM HAVING NON-LINEAR NETWORK AND CODEC DISTORTION

(75) Inventors: Carl H. Alelyunas; Scott A. Lery, both of Nevada City, CA (US); Vladimir Parizhsky, Chicago, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/421,955

(22) Filed: Oct. 19, 1999

Related U.S. Application Data

(63) Continuation of application No. 08/909,997, filed on Aug. 12, 1997, now Pat. No. 5,970,089.

(51) Int. Cl.[7] .................................................. H04B 14/04
(52) U.S. Cl. ........................ 375/242; 375/286; 375/289; 704/212
(58) Field of Search .................................. 375/242, 243, 375/244, 245, 222, 213, 224, 286, 289, 24; 341/76, 143; 704/212

(56) References Cited

U.S. PATENT DOCUMENTS

| | | | |
|---|---|---|---|
| 3,317,720 | 5/1967 | Lender | 235/154 |
| 3,781,873 | 12/1973 | Nussbaumer | 340/347 |
| 4,472,813 | 9/1984 | Koike et al. | 375/18 |
| 5,394,437 | * 2/1995 | Ayanoglu et al. | 375/222 |
| 5,406,583 | * 4/1995 | Dagdeviren | 375/5 |
| 5,528,625 | * 6/1996 | Ayanoglu et al. | 375/222 |
| 5,715,277 | 2/1998 | Goodson et al. | 375/222 |
| 5,825,823 | 10/1998 | Goldstein et al. | 375/286 |
| 5,970,089 | * 10/1999 | Alelyunas et al. | 375/222 |

FOREIGN PATENT DOCUMENTS

| | | |
|---|---|---|
| 0 669 740 A2 | 8/1995 | (EP) . |
| WO 96/18261 | 6/1996 | (WO) . |

OTHER PUBLICATIONS

PCT International Preliminary Examination Report, PCT/US98/16725, Oct. 28, 1999.
PCT Written Opinion, PCTUS98/16725, Jun. 8, 1999.
International Search Report for PCT Application Serial No. PCT/US98/16725, Dated Mar. 3, 1999.

* cited by examiner

*Primary Examiner*—Stephen Chin
*Assistant Examiner*—Mohammad Ghayour
(74) *Attorney, Agent, or Firm*—McDonnell Boehnen; Hulbert & Berghoff; Thomas E. Wetterman

(57) ABSTRACT

The present invention provides a method of generating a signal that may be used to determine the characteristic response of a communication channel that utilizes the public Digital Telephone Network (DTN). The channel includes the DTN, which may have Network Digital Attenuators (NDA) and/or Robbed Bit Signalling (RBS), and a Digital-to-Analog Converter (DAC), (also known as a codec), as well as the analog characteristics of the local loop, typically a twisted pair of copper wires. The present invention provides a method and apparatus to determine the optimal sampling instant of the received data stream. The present invention provides a probing signal that is well-suited for use in determining the channel's response to a known sequence of PCM codes used as data symbols. This is especially useful in so-called PCM modulation schemes that utilize the DTN, where knowledge of network and DAC distortion predicates the selection of available PCM codes used to represent data. This information is also useful when the data receiver, or PCM modem, makes determinations of which codes were actually sent.

16 Claims, 3 Drawing Sheets

METHOD AND APPARATUS FOR GENERATING A PROBING SIGNAL FOR A SYSTEM HAVING NON-LINEAR NETWORK AND CODEC DISTORTION

This application is a continuation of application Ser. No. 08/909,997 filed Aug. 12, 1997 now U.S. Pat. No. 5,970,089.

BACKGROUND OF THE INVENTION

1. Field of the Invention

The present invention relates to a method and device for generating a probing signal for use in a pulse code modulation (PCM) data communication system. The communication system of particular interest herein uses the public digital telephone network (DTN) to transmit data. The presence of Robbed-Bit-Signaling (RBS) and/or a Network Digital Attenuators (NDA), and codec conversion distortion within the DTN impacts negatively upon the communication system performance. Determining its presence in the system allows the communication devices to minimize the impact of the distortion. The probing signal of the present invention exhibits properties particularly well suited for distortion detection.

2. Description of the Related Art

For many years the public digital telephone network (DTN) has been used for data transmission between modems. Typically, a modulated carrier is sent over a local loop to a service provider (e.g., a Regional Bell Operating Company), whereupon the service provider quantizes the signal for transmission through the DTN. A service provider that is located near the receiving location converts the digital signal back to an analog signal for transmission over a local loop to the receiving modem. This system is limited in the maximum achievable data rate at least in part by the sampling rate of the quantizers, which is typically 8 kHz (which rate is also the corresponding channel transmission rate, or clock rate, of the DTN).

Furthermore, the analog-to-digital (AID) and digital-to-analog (D/A) conversions are typically performed in accordance with a non-linear quantizing rule. In North America, this conversion rule is known as $\mu$-law. A similar non-linear sampling technique known as A-law is used in certain areas of the world such as Europe. The non-linear A/D and D/A conversion is generally performed by a codec (coder/decoder) device located at the interfaces between the DTN and local loops. Alternatively, these devices are referred to herein as a DAC (digital-to-analog converter) and an ADC (analog-to-digital converter).

It has been recognized that a data distribution system using the public telephone network can overcome certain aspects of the aforesaid limitations by providing a digital data source connected directly to the DTN, without an intervening codec. In such a system, the telephone network routes digital signals from the data source to a client's local subscriber loop without any intermediary analog facilities, such that the only analog portion of the link from the data source to the client is the client's local loop (plus the associated analog electronics at both ends of the loop). The only codec in the transmission path is the one at the DTN end of the client's subscriber loop.

FIG. 1 shows a block diagram of a data distribution system. The system includes a data source 10, or server, having a direct digital connection 30 to a digital telephone network (DTN) 20. A client 40 is connected to the DIN 30 by a subscriber loop 50 that is typically a two-wire, or twisted-pair, cable. The DTN routes digital signals from the data source 10 to the client's local subscriber loop 50 without any intermediary analog facilities such that the only analog portion of the link from the server 10 to the client 40 is the subscriber loop 50. The analog portion thus includes the channel characteristics of the subscriber loop 50 plus the associated analog electronics at both ends of the subscriber loop 50. The analog electronics are well known to those skilled in the art and typically include a subscriber line interface card at the central office that includes a codec, as well as circuitry used to generate and interpret call progress signals (ring voltage, on-hook and off-hook detection, etc.). In the system of FIG. 1, the only codec in the transmission path from the server 10 to the client 40 is a DAC located at the DTN 20 end of the subscriber loop 50. It is understood that the client-side, or subscriber-side, equipment may incorporate an ADC and DAC for its internal signal processing, as is typical of present day modem devices. For the reverse channel, the only ADC converter in the path from the client 40 to the server 10 is also at the DTN 20 end of the subscriber loop 50.

In the system of FIG. 1, the server 10, having direct digital access to the DTN 20 may be a single computer, or may include a communications hub that provides digital access to a number of computers or processing units. Such a hub/server is disclosed in U.S. Pat. No. 5,528,595, issued Jun. 18, 1996, the contents of which are incorporated herein by reference. Another hub/server configuration is disclosed in U.S. Pat. No. 5,577,105, issued Nov. 19, 1996, the contents of which are also incorporated herein by reference.

In the system shown in FIG. 1, digital data can be input to the DTN 20 as 8-bit bytes (octets) at the 8 kHz clock rate of the DTN. This is commonly referred to as a DS-O signal format. At the interface between the DIN 20 and the subscriber loop 50, the DTN 20 codec converts each byte to one of 255 analog voltage levels (two different octets each represent 0 volts) that are sent over the subscriber loop 50 and received by a decoder at the client's location. The last leg of this system, i.e., the local loop 50 from the network codec to the client 40, may be viewed as a type of baseband data transmission system because no carrier is being modulated in the transmission of the data. The baseband signal set contains the positive and negative voltage pulses output by the codec in response to the binary octets sent over the DTN. The client 40, as shown in FIG. 1, may be referred to herein as a PCM modem.

FIG. 3 shows a $\mu$-law to linear conversion graph for one-half of the $\mu$-law codeword set used by the DTN 20 codec. As shown in FIG. 3, the analog voltages (shown as decimal equivalents of linear codewords having 16 bits) corresponding to the quantization levels are non-uniformly spaced and follow a generally logarithmic curve. In other words, the increment in the analog voltage level produced from on codeword to the next is not linear, but depends on the mapping as shown in FIG. 3. Note that the vertical scale of FIG. 3 is calibrated in integers from 0 to 32,124. These numbers correspond to the linear 16-bit A/D converter. As in known to those of ordinary skill in the art, the sixteenth bit is a sign bit which provides integers from 0 to −32124 which correspond to octets from 0 to 127, not shown in FIG. 3. Thus FIG. 3 can be viewed as a conversion between the logarithmic binary data and the corresponding linear 16-bit binary data. It can also be seen in FIG. 3 that the logarithmic function of the standard conversion format is approximated by a series of 8 segments.

The conversion from octet to analog voltage (or a digital representation of the analog voltage, as discussed above) is well known, and as stated above, is based on a system called μ-law coding in North America and A-law coding in Europe. Theoretically, there are 256 points represented by the 256 possible octets, or μ-law codewords. The format of the μ-law codewords is shown in FIG. 2, where the most significant bit $b_7$ indicates the sign, the three bits $b_6$-$b_4$ represent the linear segment, and the four bits, $b_0$-$b_3$ indicate the step along the particular linear segment. These points are symmetric about zero; i.e., there are 128 positive and 128 negative levels, including two encodings of zero. Since there are 254 non-zero points, the maximum number of bits that can be sent per signaling interval (symbol) is just under 8 bits. A μ-law or A-law codeword may be referred to herein as a PCM codeword. It is actually the PCM codeword that results in the DTN 20 codec to output a particular analog voltage. The codeword and the corresponding voltage may be referred to herein as "points."

Other factors, such as robbed-bit signaling, digital attenuation (pads), channel distortion and noise introduced by the subscriber loop, and the crowding of points at the smaller voltage amplitudes and the associated difficulty in distinguishing between them at the decoder/receiver, may reduce the maximum attainable bit rate. Robbed Bit Signaling (RBS) involves the periodic use of the least significant bit (LSB) of the PCM codeword by the DTN 20 to convey control information. Usually the robbed bit is replaced with a logical '1' before transmission to the client 40. The DTN performs robbed-bit signalling on a cyclic basis, robbing the 1sb of an individual channel every sixth PCM codeword. In addition, due to the fact that a channel might traverse several digital networks before arriving at the terminus of the DTN 20, more than one PCM codeword per 6 time slots could have a bit robbed by each network, with each network link robbing a different 1sb.

To control power levels, some networks impose digital attenuators that act on the PCM codewords to convert them to smaller values. Unlike most analog attenuators, a network digital attenuator (NDA) is not linear. Because there are a finite number of digital levels to choose from, the NDA will be unable to convert each codeword to a unique, lower magnitude codeword. This causes distortion of the analog level ultimately transmitted by the codec over the subscriber loop 50. RBS and an NDA can coexist in many combinations. For example, a PCM interval could have a robbed bit of type '1', followed by an NDA followed by another robbed bit of type '1'. This could happen to a byte if a channel goes through a bit-robbed link, then through an NDA, then another bit-robbed link before reaching the DTN 20 codec.

It is evident that the above-described data transmission system may corrupt and distort the points that are used to transmit data through the system: e.g., 1sbs may be robbed during some time slots thereby making some points unavailable in that time slot; digital attenuators may make some points ambiguous; the codec may not generate the analog voltages accurately; and, noise on the local loop may prevent the use of closely spaced points for a desired error rate. Thus it is desirable to be able to determine what types of distortion are present in the system so that the communication devices may minimize the effects of the distortion.

SUMMARY OF THE INVENTION

The present invention provides a method of generating a signal that may be used to determine the characteristic response of a communication channel that utilizes the public Digital Telephone Network (DTN). The channel includes the DTN, which may have Network Digital Attenuators (NDA) and/or Robbed Bit Signaling (RBS), and a Digital-to-Analog Converter (DAC), (also known as a codec), as well as the analog characteristics of the local loop, typically a twisted pair of copper wires. The present invention provides a method and apparatus to determine the optimal sampling instant of the received data stream. The present invention provides a probing signal that is well-suited for use in determining the channel's response to a known sequence of PCM codes used as data symbols. This is especially useful in so-called PCM modulation schemes that utilize the DTN, where knowledge of network and DAC distortion predicates the selection of available PCM codes used to represent data. This information is also useful when the data receiver, or PCM modem, makes determinations of which codes were actually sent.

It is therefore an object of the present invention to provide a probing signal that progresses through each robbed-bit time slot with an equal number of positive and negative probing levels for each digital value.

It is a further object of the invention to provide a probing signal that is significantly tolerant of inter-symbol interference to within four symbol periods.

It is another object of the invention to provide a method of probing PCM codec conversion levels in the presence of non-linear analog distortion.

It is a further object of the invention to provide a method of probing many levels within a short period of time, e.g., 114 levels in less than one second on an 8 KHz sampled DTN channel.

It is a further object of the invention to provide a probing method accurate enough so that the levels learned can be used as decision values in highly distorted DTN channels.

It is a further object of the invention to provide a signal that contains enough energy near half-symbol rate such that symbol timing can be extracted.

It is a further object of the invention to provide a circuit that efficiently derives sample timing information from the probing signal.

BRIEF DESCRIPTION OF THE DRAWINGS

The foregoing and other objects, features and advantages of the present invention will be more readily appreciated upon reference to the following disclosure when considered in conjunction with the accompanying drawings, in which.

DETAILED DESCRIPTION OF THE PREFERRED EMBODIMENT

Figure 1:
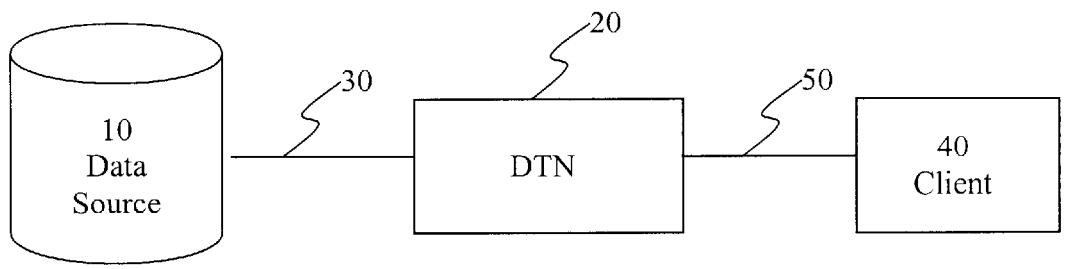
FIG. 1 depicts a communications network with a data source having direct digital access to the DTN.
Figure 2:
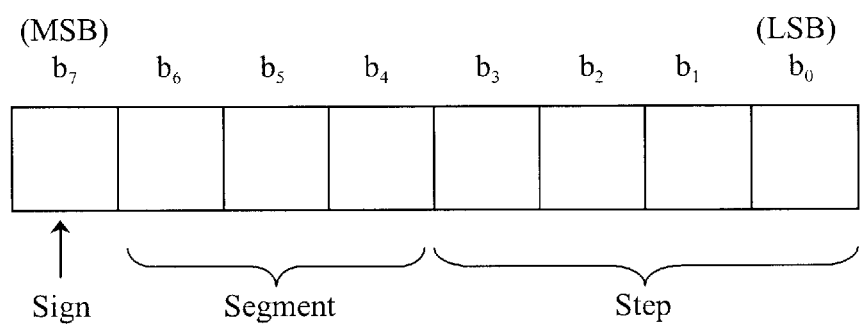
FIG. 2 shows the elements of a μ-law codeword.
Figure 3:
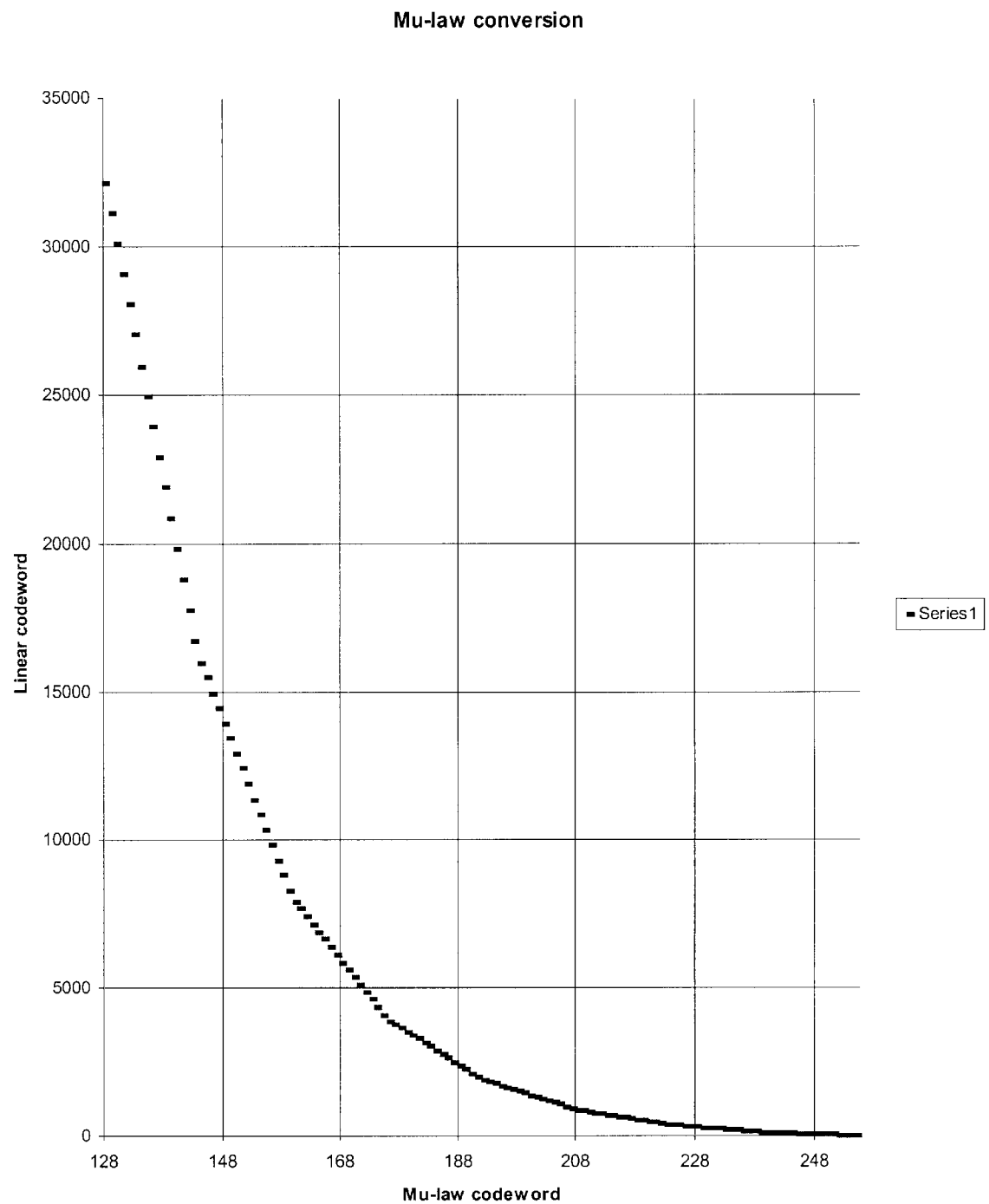
FIG. 3 shows a μ-law to linear conversion graph.

The preferred probing signal that is used in the present invention may be broken into constituent components: a sequence of signal values, and a kernel. The kernel is a type of probing frame template that is used to generate the probing signal. The kernel is made up of positive and negative one (±1) and zero (0) elements that define the basic pattern of symbols, or signal values, within a probing frame. The probing signal values are the PCM codes that are being probed. The sequence of signal values is used with the kernel to generate a sequence of probing frames, one frame for each value. To generate one frame of the probing signal, all the elements of the kernel are multiplied (in the linear, symbol-by-symbol sense) by one of the values to be probed. Additional frames of the probing signal are generated in a similar manner, one frame for each value to be probed The PCM codes that make up the probing signal are sent from an encoder to the DTN, and ultimately to a DAC at one end of a subscriber loop, where they are converted to analog levels.

The kernel is a sequence that preferably has the following properties:

1. Each unity value (positive and negative) within the kernel is preceded by, and followed by, a number of periods of zero values. It is preferred that the unity values resemble a unit impulse over as large a window as possible. This minimizes the effect of each signal value on adjacent signal values (i.e., this minimizes ISI).
2. There are as many positive unity values as negative unity values in every sixth position in the sequence. This eliminates or substantially reduces any DC components in the probing signal.
3. Within a sliding window of approximately half-frame length (e.g., one half of the kernel length), the signal has a high energy component at the half symbol rate frequency, as measured by iterative discrete Fourier transforms of the windowed values. This maximizes the energy of the signal that is useful for recovering timing information at the receiver.

The kernel also preferably has the following desirable, but less significant, properties:

1. There is a lead-in period or guard band of all zero elements.
2. Negative and positive unity values alternate.
3. The kernel is as short as possible.

One preferred sequence, which is nearly minimal in length, is:

0,0,0,0,0,0,
0,0,1,0,0,0,
0,-1,0,0,0,0,
1,0,0,0,0,-1,
0,0,0,0,1,0,
0,0,0,-1,0,0,—three intervening zeros
0,1,0,0,0,0,
-1,0,0,0,0,1,
0,0,0,0,-1,0,
0,0,0,1,0,0,
0,0,-1,0,0,0

The initial six all-zero elements of the kernel may be omitted. The kernel specified above consists of alternating positive and negative impulses that will correspond to positive and negative valued codewords of the probing signal. Interposed between the positive and negative pulses (or codewords) are periods of intervening zero values. In the above sequence the number of intervening zeros is four for all intervals except for a centrally located interval having only three zeros. The remaining intervals are referred to herein as laterally located intervening intervals. Alternatively, the centrally located all-zero interval may have five zeros, and still result in a kernel with the desired properties. This kernel is set forth below (the initial zeros are omitted)

0,0,1,0,0,0
0,-1,0,0,0,0
1,0,0,0,0,-1
0,0,0,0,1,0
0,0,0,-1,0,0—five intervening zeros
0,0,0,-1,0,0
0,0,-1,0,0,0
0,1,0,0,0,0
-1,0,0,0,0,1
0,0,0,0,-1,0

Alternatively, the laterally located intervening zero intervals may of duration six, and the duration of the centrally located interval may be five or seven. These kernels are set forth below:

0,0,1,0,0,0
0,0,0,-1,0,0
0,0,0,0,1,0
0,0,0,0,0,-1
0,0,0,0,0,0
1,0,0,0,0,0
0,-1,0,0,0,0—five zeros here
0,1,0,0,0,0
0,0,-1,0,0,0
0,0,0,1,0,0
0,0,0,0,-1,0
0,0,0,0,0,1
0,0,0,0,0,0
-1,0,0,0,0,0
0,0,1,0,0,0
0,0,0,-1,0,0
0,0,0,0,1,0
0,0,0,0,0,-1
0,0,0,0,0,0
1,0,0,0,0,0
0,-1,0,0,0,0—seven zeroes here
0,0,0,1,0,0
0,0,0,0,-1,0
0,0,0,0,0,1
0,0,0,0,0,0
-1,0,0,0,0,0
0,1,0,0,0,0
0,0,-1,0,0,0, The sequence of values, or magnitudes, to be multiplied by the kernel is dependent on the system. In a PCM system that uses the DTN, it is often desirable to probe all the values that are to be used as data symbols, or all of those values that are initial candidates for data symbols. Some of the PCM codeword candidates may eventually be unusable depending upon the nature of the network and codec distortion. Furthermore, it is also desirable to probe the smaller levels with multiple repetitions of the kernel, as the smaller levels are closer together. The probing of all the PCM codewords that are to be used allows the receiver to make more accurate decisions when in normal operation. It is also desirable to alternate large and small values in some sequence if there is no other signal present, to avoid turning on the network echo-canceling circuitry. A progressive alternation of signal values is used:

LV, SV, LV−1,SV+1,LV−2,SV+2,etc.;

where LV is the largest signal value, LV−1 is the second largest signal value, etc. and SV is the smallest signal value and SV+1 is the second smallest signal value, etc.

Alternatively, a subset of the values may used to generate the probing signal. The subset must consist of enough values to allow the receiver to determine the nature of the network distortion. For most cases, it has been found empirically that a subset having three values is sufficient to determine the nature of the network distortion.

Figure 4:
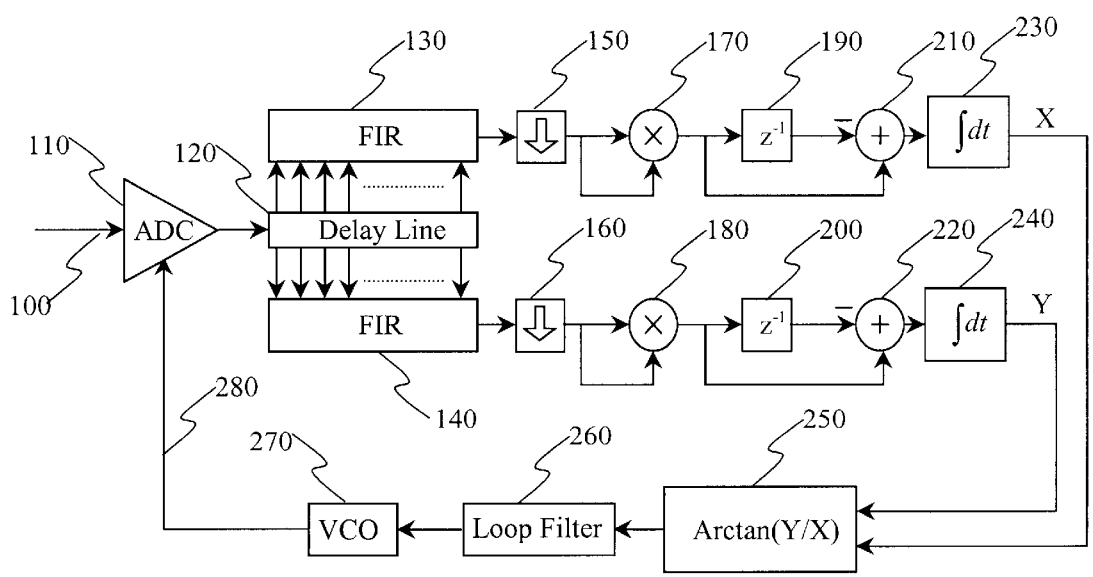
FIG. 4 shows a block diagram of a preferred embodiment of the timing recovery circuit for use with the probing signal.
Figure 5:
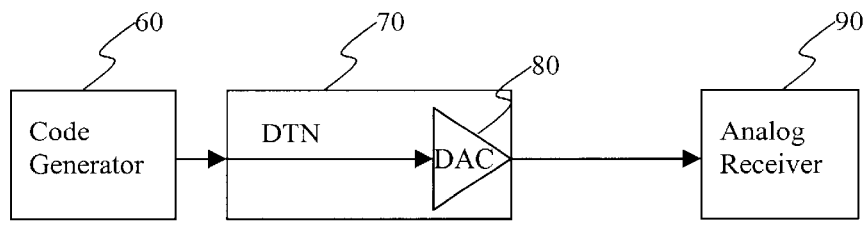
FIG. 5 shows a block diagram of the system utilizing the probing signal.

The probing signal defined above is particularly well suited for use in timing recovery in a PCM modem receiver. This is desirable so that the sampling instant may be optimized in conjunction with the channel probing. The apparatus of FIG. 4 is a preferred timing recovery apparatus for use with the probing signal described herein. The probing signal is received on line 100, and is converted to a digital sequence by the analog to digital converter (ADC) 110 at approximately twice the symbol rate. The ADC 110 is preferably a linear converter. The preferred probing signal contains band edge information, i.e. discernable signal content at one half the symbol, or baud, rate. The DTN channel has a network byte rate of 8 KHz (8 bit bytes at 8 KHz for a network bit rate of 64 Kbps). Thus, the sampling rate of DAC 110 is 16 KHz. The digital signal is passed down a delay line 120 of length 32. The length of the delay line was determined empirically, and may alternatively be of a different length than that specified above. The delayed samples are passed to two FIR structures 130 and 140. The output of the FIR is down-sampled by decimators 150 and 160, which take every other output, thereby providing outputs at the symbol rate. FIR 130 contains taps of the sequence 1,0,−1, 0,1,0,−1,0 . . . (for a total of 32 filter coefficients) and FIR 140 contains taps of the sequence 0.707, 0.707, −0.707, −0.707, 0.707, 0.707, −0.707, −0.707 . . . (for a total of 32 filter coefficients). The filter coefficients may generated by the following formulas:

$$\cos(k\pi/2+\phi) \text{ and } \cos(k\pi/2 - \pi/4+\phi); k=0, \ldots, 31.$$

The angle designated by $\phi$ may be any value.

The FIR filters 130 and 140 may be thought of as frequency selective filters centered at one half the baud rate, or $F_{B/2}$. This frequency component of the probing signal contains the timing information that may be used to derive the optimal sampling time as discussed below. The windowing of the FIR does not significantly distort the information of the $F_{B/2}$ component. Specifically, the FIR filter response is a sinc function $(\sin(x)/x)$ centered about the 4 KHz component. The filter provides enough discrimination to significantly attenuate the other signal components.

When decimated, the $F_{B/2}$ component passed by the FIR 130 and 140 coincides with a frequency having one half the resulting sampling rate. In addition, the FIR filters 130 and 140 are phase selective, and preserve the phase information of the component having the timing information. This is largely due to the symmetry associated with the FIR coefficients. The phase information associated with the $F_{B/2}$ frequency signal is directly used to control the sampling instant in the remainder of the circuit discussed below.

In particular, in the preferred embodiment, the signal on line 100 is sampled at a rate of $F_{S1}$=16 KHz, where the baud rate is 8 KHz. The decimators 150 and 160 make the effective sampling rate 8 KHz, i.e., $F_{S2}$=8 KHz. The outputs of decimators 150 and 160 are therefore the equivalent of a 4 KHz signal component sampled at 8 KHz.

The FIR filters 130 and 140 are also designed to provide a difference of phase between the two FIR filters of one-eighth cycle. The signals are squared by multipliers 170 and 180, which effectively doubles the frequency of the signal, and results in a one-quarter cycle difference between the two outputs. The output signals of multipliers 170 and 180 are signals at the symbol rate with some DC offset component. The DC offset is removed by delaying one symbol time by delay elements 190 and 200, and subtracting the delayed value from the present value with subtractors 210 and 220. Because the signal contains essentially only sample rate information, with a phase difference of one-quarter cycle, sampled at symbol rate, the values filtered by low pass filters 230 and 240 (shown as integrators—a simple low-pass filter) represent a phasor in two dimensions. The phasor may be converted to one dimension by an arctangent Y/X converter 250. The arctangent converter operates as an error signal generator to generate a timing error signal. The error signal is applied to the loop filter 260, and subsequently to Voltage Controlled Oscillator 270 to complete a phase lock loop circuit. Without loss of generality, the ADC 110 may be replaced by a resampling interpolator, and the entire structure may be implemented in a microprocessor program.

In operation, when the sampling instant is optimal, the output of low pass filter 230 is maximized and the output of low pass filter 240 is near zero. The output of the arctangent converter 250 is also zero, the loop filter 260 output is stable, and the VCO 270 remains unaltered thereby continuing to provide the optimal sampling timing signal. If the output of low pass filter 240 is positive, then the output of the arctangent converter 250 provides a slightly positive output. This value is filtered by loop filter 260, and sent to VCO 270 resulting in a slight increase in the sampling frequency. The effect is that the sampling instant begins to move to an earlier part of the interval. As the optimal sampling time is approached, the outputs return to zero indicating the VCO 270 is supplying the optimal timing information to ADC 110.

One purpose of the probing signal is to discern network and DAC distortions within an analog receiver, using a priori knowledge of the sequence of codes sent through the network. With reference to FIG. 6, the code generator 60 sends a series of codes to the network 70 consisting of a kernel described above, which is multiplied on a symbol by symbol basis by the codes. The code distortion done by the network typically has an unknown transfer characteristic. Often this characteristic is cyclic by six symbols, especially in the case of Robbed-Bit signalling applied by the PSTN (Public Switched Telephone Network). The distorted codes are sent to the DAC 80 that can cause additional distortion by imprecise level conversion of an unknown nature. The aggregate of the distortions is applied to the analog receiver 90.

A preferred embodiment of the present invention has been described herein. It is to be understood, of course, that changes and modifications may be made in the embodiment without departing from the true scope of the present invention, as defined by the appended claims.

We claim:

1. A method of probing a communication channel between a digital data source and an analog subscriber connected to a digital telephone network by an analog loop comprising the steps of:

providing a kernel sequence having elements selected from the group of +1, −1, and 0;

providing a sequence of PCM code magnitudes;

generating a probing signal from said kernel sequence and said sequence of PCM code magnitudes; and transmitting said probing signal over the communication channel.

2. A method as in claim 1 where the generating step comprises the step of:

multiplying each said PCM code magnitudes by said elements of said kernel sequence.

3. A method as in claim 2 wherein all said elements having a value of +1 and −1 are followed by at least one zero element.

4. A method as in claim 3 wherein the kernel is comprised of a sequence of +1 elements and −1 elements such that every sixth symbol has an equal number of +1 elements and −1 elements.

5. A method as in claim 2 where the kernel further comprises an initial sequence of zero PCM codewords.

6. A method as in claim 3 where the +1 elements and the −1 elements alternate.

7. A method as in claim 1 wherein said sequence of PCM code magnitudes is a sequence of all PCM codeword magnitude candidates.

8. A method as in claim 1 wherein said sequence of PCM code magnitudes is a subset of candidate PCM codewords.

9. A method as in claim 8 wherein said subset has at least three values.

10. A code generator for generating a probing signal for transmission over a communication channel between a digital data source and an analog subscriber connected to a digital telephone network by an analog loop, wherein said probing signal consists of a sequence of PCM codewords, said codeword sequence having a plurality of positive and negative values with regions of zero values therebetween, said regions comprising a centrally located region of intervening zero values and a plurality of lateral regions of intervening zero values.

11. The code generator of claim 10 wherein the duration of said lateral regions of intervening zeros is four codewords.

12. The code generator of claim 11 wherein the duration of said centrally located region of intervening zeros is three codewords.

13. The code generator of claim 11 wherein the duration of said centrally located region of intervening zeros is five codewords.

14. The code generator of claim 10 wherein the duration of said lateral regions of intervening zeros is six codewords.

15. The code generator of claim 14 wherein the duration of said centrally located region of intervening zeros is five codewords.

16. The code generator of claim 14 wherein the duration of said centrally located region of intervening zeros is seven codewords.

* * * * *